United States Patent [19]

Tsai

[11] Patent Number: 4,919,082
[45] Date of Patent: Apr. 24, 1990

[54] REMOTE CONTROL ANIMAL COLLAR

[76] Inventor: David M. Tsai, 124 Benedict La., Raleigh, N.C. 27614

[21] Appl. No.: 275,016

[22] Filed: Nov. 22, 1988

Related U.S. Application Data

[63] Continuation-in-part of Ser. No. 230,957, Aug. 11, 1988.

[51] Int. Cl.⁵ .................... A01K 15/00; A01K 27/00
[52] U.S. Cl. ....................................... 119/29; 119/106
[58] Field of Search ................... 119/29, 96, 106, 108, 119/109, 110; 54/1, 69, 71; 340/825.69, 573; 318/16; 128/883, 885, 886

[56] References Cited

U.S. PATENT DOCUMENTS

| 2,821,169 | 1/1958 | Barnhorst | 119/110 |
| 3,099,250 | 7/1963 | Soles, Jr. | 119/106 |
| 3,505,979 | 4/1970 | Rosswag | 119/110 |
| 3,699,578 | 10/1972 | Fiorentino | 318/16 X |
| 3,732,570 | 5/1973 | Fiorentino | 318/16 X |
| 3,733,530 | 5/1973 | Labart et al. | 318/16 |

Primary Examiner—Robert P. Swiatek
Assistant Examiner—R. Thomas Price
Attorney, Agent, or Firm—James J. Brown

[57] ABSTRACT

An animal training collar is described which is remotely controlled so that pressure can be applied to the neck of the animal from a remote location by the master. The collar contains a radio receiver and elements for applying pressure to the animal's neck on receipt of the appropriate signal from a transmitter.

7 Claims, 8 Drawing Sheets

REMOTE CONTROL ANIMAL COLLAR

CROSS-REFERENCE TO RELATED PATENT APPLICATIONS

This application is a continuation-in-part of application, Ser. No. 07/230,957, filed Aug. 11, 1988.

SUMMARY OF THE INVENTION

The present invention is directed to an animal training collar which encircles the neck of the animal and is provided with a mechanism for exerting pressure on the neck of the animal in response to a remotely transmitted signal.

BACKGROUND OF THE INVENTION

The training of animals, and in particular dogs, so that they will obediently respond to vocal commands is often accomplished by means of leashes and collars which permit the transmission of physical force in one form or another to the animal in conjunction with the vocal commands. For example, choke chains have commonly been employed for this purpose and are attached to a leash so that the choke chain around the neck of the animal can be tightened or relaxed in accordance with the animal's response to the given command. Such devices, however, have the disadvantage that they require the human master to be in fairly close proximity to the animal since it is impractical for the leash to be of any great length.

To provide a remote signal which is not dependent upon the length of a leash, it has been proposed to provide various radio controlled devices which produce shock or other potentially harmful or misunderstood stimulation to the animal. Such devices of the prior art are illustrated and described in the following United States Patents:

U.S. Pat. No. 3,589,337 to Doss describes an animal training device which may be a collar or harness which provides an electric shock to the animal in response to a remotely transmitted radio signal.

U.S. Pat. No. 3,733,530 to Labart, et al. describes a bucking strap to be used on a bucking horse or Brahma bull in a rodeo to permit a judging official to remotely disconnect the strap.

U.S. Pat. No. 4,180,013 to Smith describes an animal behavior control device which produces a vibration on the animal's neck in response to barking or other noise emitted from the animal itself.

U.S. Pat. No. 4,651,678 to Kime describes a device for controlling the reins, crop or spurs applied to a riding horse which device is controlled by radio to simulate the actions of a jockey.

It is an object of the present invention to provide an improved, remotely controlled training collar for animals and in particular dogs which permits the gentle, repetitive application of pressure to the neck of the animal through the attached collar.

It is a further object of the present invention to provide an animal training collar which permits the application of pressure to the animal's neck at a remote distance from the animal being trained so that the animal is familiarized with the need to respond obediently to given commands irrespective of the proximity of the animal's master.

DETAILED DESCRIPTION OF THE INVENTION

Figure 1:
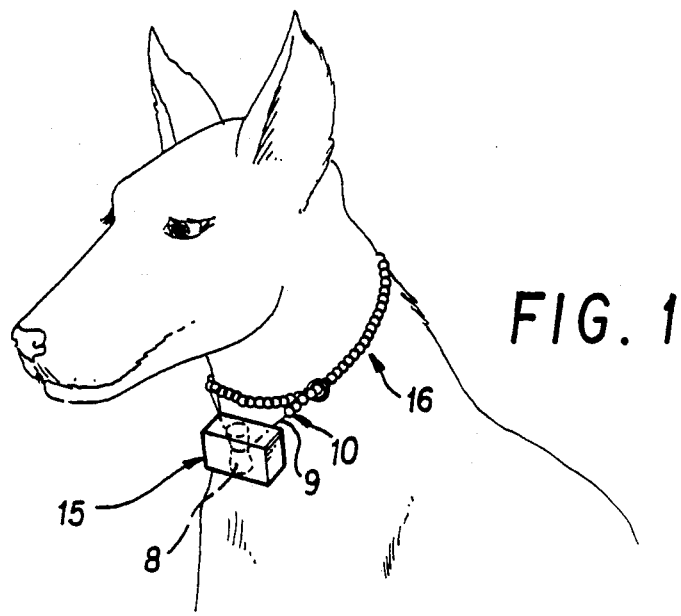
FIG. 1 illustrates the head and neck of a dog with one embodiment of the present invention attached around its neck.

In accordance with one embodiment of the present invention an adjustable animal training collar is provided which comprises a flexible strap at least a portion of which encircles the neck of an animal, such as a dog, so that pressure can be applied to the animal's neck in response to a radio signal transmitted from a remote location to the device. A radio receiver for receiving the remotely broadcast radio signal is provided on the collar and converts the received signal to an on-off switching signal which activates and deactivates the device.

In one embodiment of the invention, an electric power source such as a small battery is also provided in the unit to provide the necessary electric power to drive a small electric motor which in turn provides rotational power through its shaft to a capstan. A solenoid switch is activated by the signal received from the radio receiver and activates a clutch mechanism to thereby cause actual transmission of rotary power from the electric motor shaft to the capstan and to close a switch in the circuit which transmits electric power to the motor. The capstan in turn is connected to the flexible strap around the neck of the animal in such a way that turning of the capstan by the electric motor produces a tightening of the collar around the neck of the animal. When the signal transmitted to the radio receiver is discontinued or, alternatively, a negative signal is received, the solenoid relaxes thereby causing the clutch to disengage and the capstan to stop turning. To permit a variable rate of tightening of the collar, which may be required for animals having significantly larger or smaller necks, a rheostat is conveniently provided between the electric power source and the electric motor so that the speed of revolution of the electric motor shaft can be adjusted.

In two further embodiments of the invention, the electric motor, clutch and capstan are dispensed with to provide a simplified, less complex and expensive device. In one such simplified embodiment, the solenoid is connected directly through a piston rod to the collar so that activation of the solenoid by the radio signal causes tightening of the collar around the animal's neck. When the signal is either terminated or a negative signal received, the solenoid is deactivated and the collar relaxes around the animal's neck. In another such simplified embodiment, the collar itself is not actually tightened around the animal's neck but instead pressure is applied at one or a plurality of points around the collar through small electrically activated solenoids which drive piston rods radially inward. Activation of these solenoids is accomplished by means of a remotely transmitted radio signal in the same manner as heretofore described with respect to the other embodiments of the invention.

The details and various embodiments of the present invention will however be more completely appreciated by having reference to the drawings provided herein which are illustrative of the invention in its preferred embodiments.

Directing attention first of all to the embodiment of FIG. 1, it will be seen that the neck of the illustrated animal is encircled by a flexible collar or strap 16 which in this case is a choke chain. The mechanism of the present invention while not illustrated in this drawing, including the power source, electric motor, receiver, activation switches and clutch mechanism are all contained within the case 15 attached to the collar under the animal's chin. Connectors 10 are attached to cables which in turn encircle the capstan 8 so that turning of the capstan winds the cables around it and decreases the circumference of the chain 16 thereby applying pressure to the neck of the animal.

Figure 4:
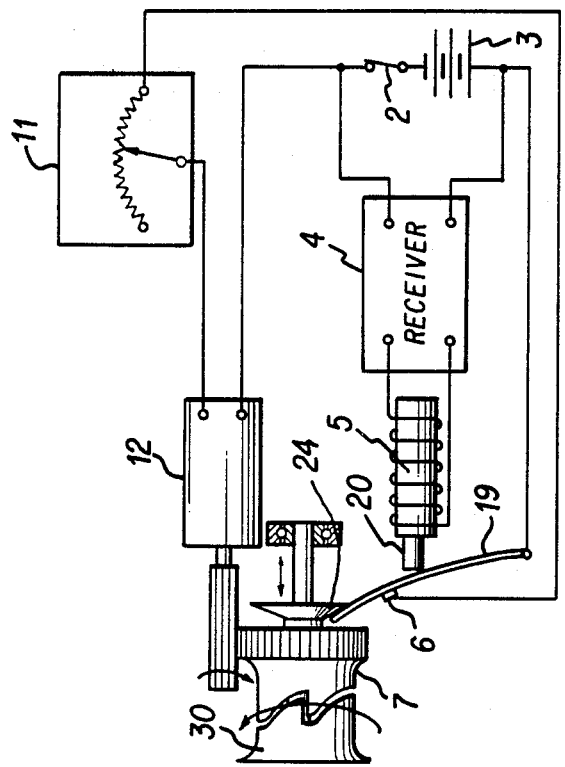
FIG. 4 is a schematic drawing of the device of FIG. 1 showing the solenoid activated clutch in the engaged or on position.

FIG. 2 illustrates the actual construction of the device of the present invention which is contained within the case 15 illustrated in FIG. 1. A transmitter 1 of standard construction is provided to permit the transmission of a radio signal remotely from the transmitter to a small radio receiver 4. The radio receiver 4 receives electric power for its operation from a battery pack 3. A simple off-on switch at 2 is provided to permit the entire unit to be turned off when not in use. The radio receiver 4 is connected to a solenoid 5 which is provided with a piston rod 20 disposed within a cavity in the solenoid. When the radio receiver 4 receives its signal from remote transmitter 1 it closes the circuit between battery 3 and solenoid 5 to transmit electrical energy to the solenoid 5 to cause the solenoid rod 20 to be displaced out of the solenoid cavity. When the electric energy to the solenoid is discontinued, the rod returns to its original position within the solenoid. It will be appreciated in this regard that the solenoid 5 and its associated rod 20 are of conventional design and consist essentially of an electromagnet having a hollow longitudinal cavity to accommodate an elongated cylindrical rod 20 which is made of a magnetic material and has suitable polarity to respond to the magnetic flux produced when the solenoid receives electrical energy. A spring plate 19 is provided with its lower end in a fixed position and engages the solenoid rod 20 at about its midpoint. This spring plate is preferably made of a conductive material and is connected to the electric power source 3. An additional electrical contact 6 is provided which engages the side of spring plate 1g when the plate is deflected toward it by the solenoid rod 20. Contact point 6 thereby provides a closed circuit between the electric power source 3 and rheostat 11 when the solenoid is activated and spring plate 19 deflected. The top end of spring plate 19 engages clutch plate 24 as illustrated in FIGS. 2 through 4 of the drawings. As particularly shown in FIG. 3, when the solenoid 5 is inactive and solenoid rod 20 is in a rest position spring plate 19 is nearly vertical and does not engage contact 6. In this position the clutch mechanism is disengaged so that no rotational force is transmitted to the capstan 8. As shown in FIG. 4 of the drawings however, when the solenoid rod 20 is displaced out of the solenoid 5 to cause deflection of spring plate 19 toothed spiral-jaw clutch cylinder 7 is displaced to the left to engage the similarly toothed portion 30 of capstan 8 so that rotational force is transmitted to the capstan 8 to cause it to turn.

The rotational force which is transmitted through the gears 22 and 23 and controlled by clutch 7, is actually produced by electric motor 12 which receives its electric power from power source 3 through the variable rheostat 11 which, as previously described permits adjustment of the speed of rotation of shaft 21 by the motor 12.

Figure 2A:
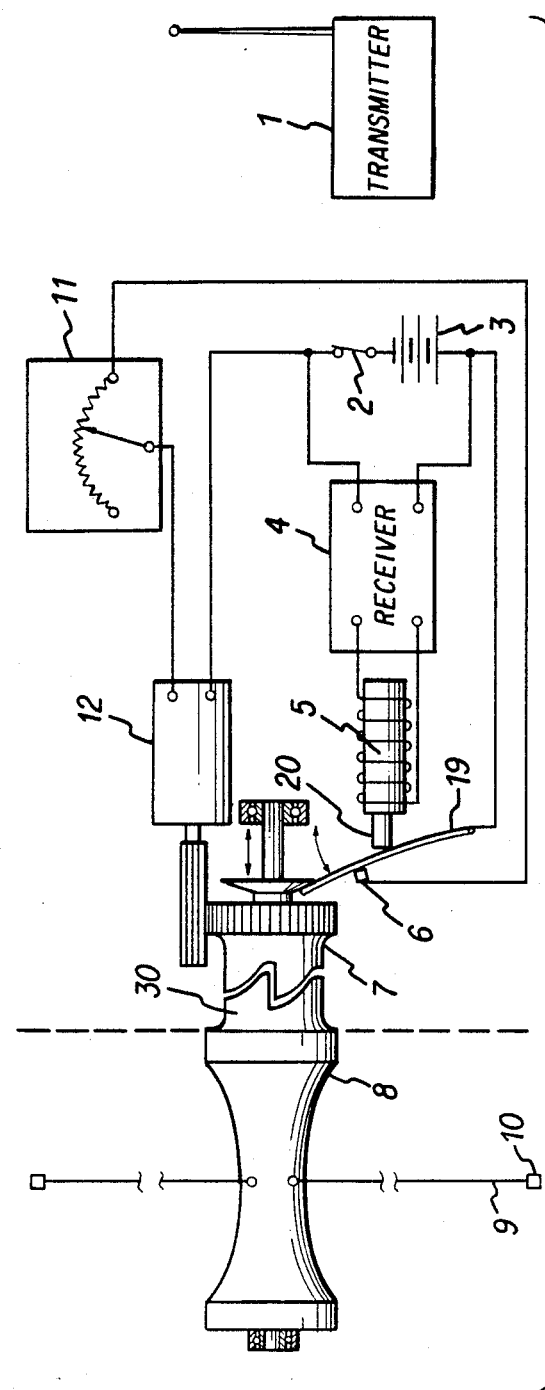
FIGS. 2A and 2B are schematic drawings of the device of FIG. 1 including two alternative capstan structures but omitting the actual collar strap.
Figure 2B:
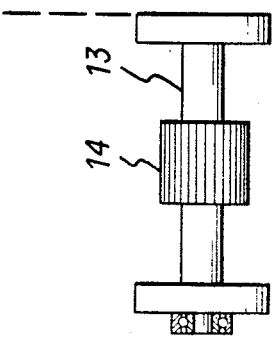
Figure 3:
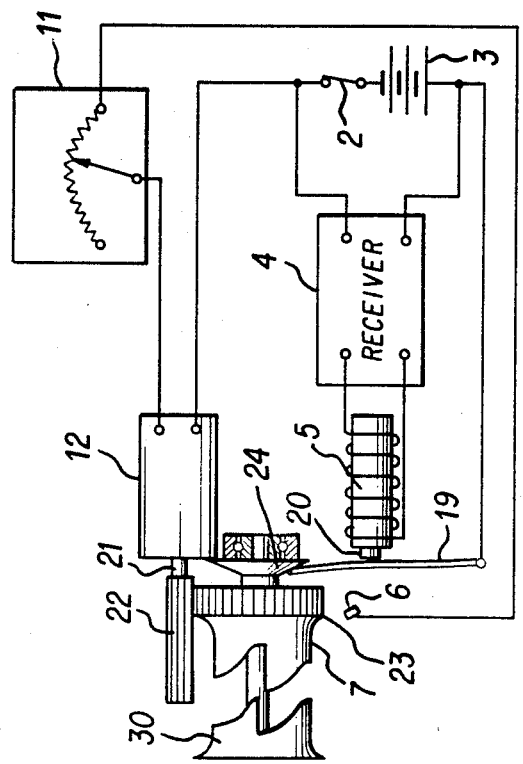
FIG. 3 is a schematic drawing of the device of FIG. 1 showing the solenoid activated clutch in the disengaged or off position.
Figure 5:
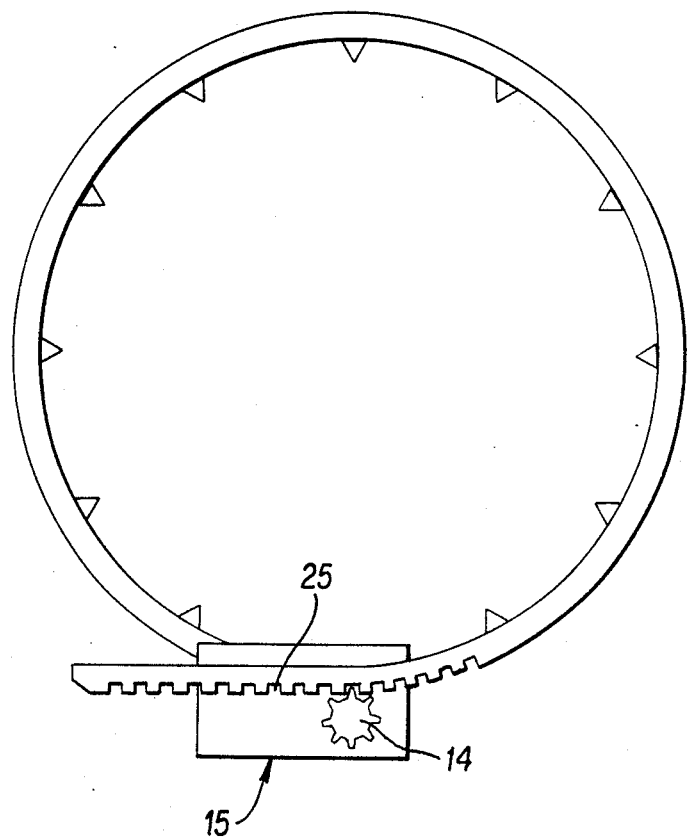
FIG. 5 is a cutaway side view showing one embodiment of the invention in which the pinch collar engages directly with the capstan of the invention.

As seen in FIG. 2 of the drawings, the capstan 8 can have several different configurations for tightening the collar of the device around the animals neck in response to the radio transmitted signal. As shown in FIG. 2A, the capstan 8 is provided with means for connecting cable 9 in such a way that turning of the capstan 8 will cause the cable to be wound around the capstan thereby shortening it and pulling the connectors 10 closer together. As further illustrated in FIGS. 6 and 7 of the drawings this pulling of the connectors 10 closer together has the effect of tightening or shortening the chain or collar around the neck of the animal. Alternatively, as illustrated in FIG. 2B of the drawings the capstan 13 is provided with a gear 14 which engages gear rack 25 on the end of pinch collar 18 as shown in FIG. 5 of the drawings. Rotation of the capstan has the effect of shortening the length of the pinch collar thereby tightening it around the animals neck.

Figure 6:
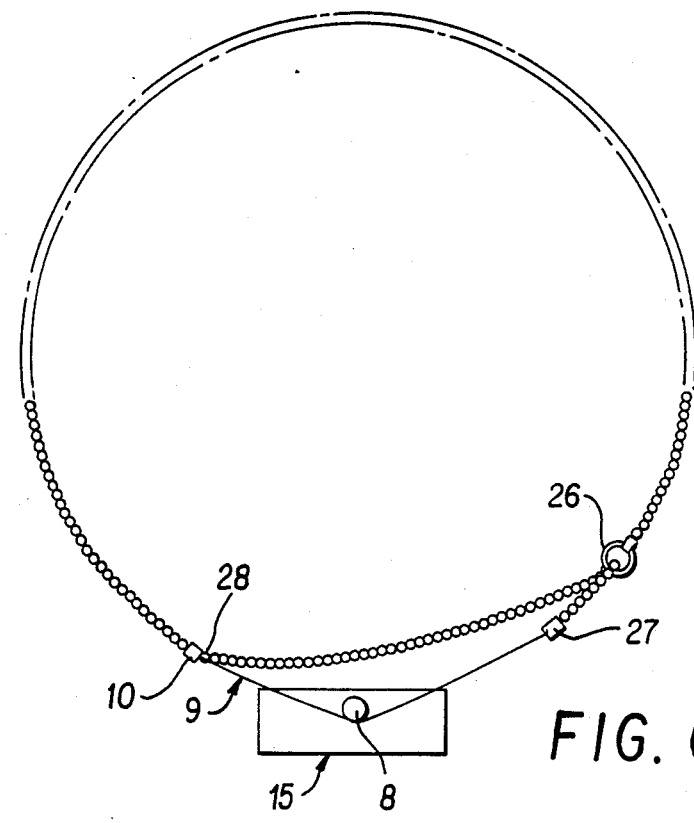
FIG. 6 is a cutaway side view illustrating the capstan drive of another embodiment of the invention.
Figure 7:
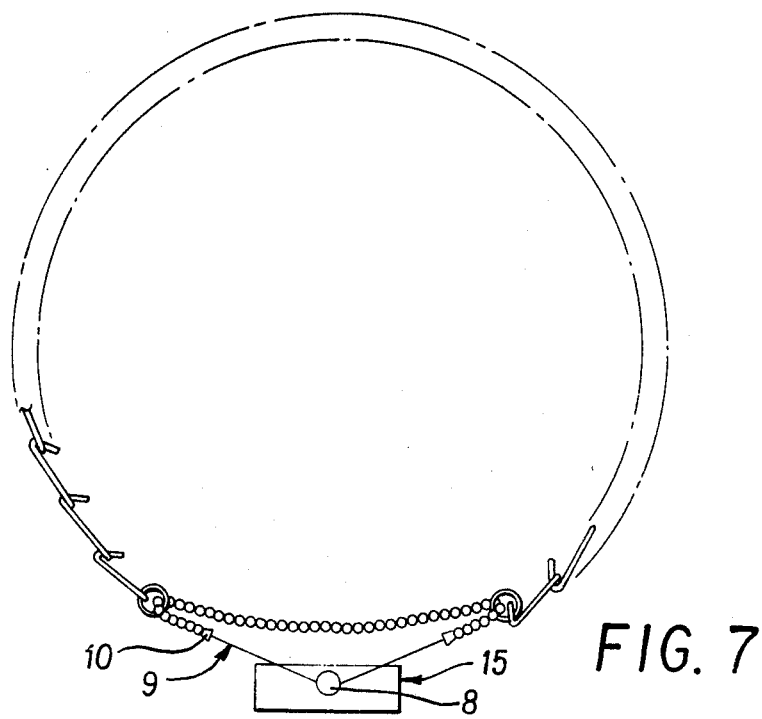
FIG. 7 illustrates a further embodiment with the capstan drive in use with a pinch collar.

As also illustrated in FIGS. 6 and 7 of the drawings, various types of straps or chains commonly used in the art as obedience collars for training animals can be employed in the device of the present invention. FIG. 6 of the drawings for example illustrates the use of a flexible choke chain 16 which is provided at one location with a simple ring 26 through which choke chain 16 passes. The choke chain is attached to the cable connector 10 at its end 27 to the cable 9 which is itself attached to the capstan 8. Winding of the cable g around the capstan causes choke chain 16 to be drawn through the ring 26 thereby causing tightening of the chain around the neck of the animal. A similar construction is shown in use with a pinch collar 17 in FIG. 7 of the drawings.

Figure 8:
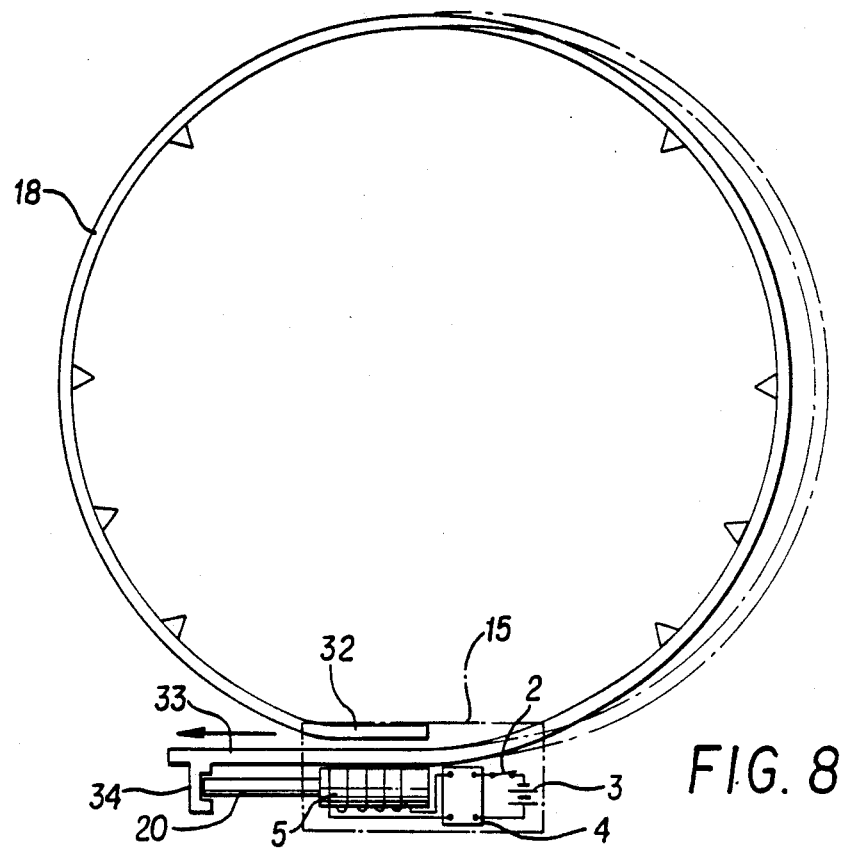
FIG. 8 is a cutaway side view illustrating a further embodiment of the invention with the collar tightened.
Figure 9:
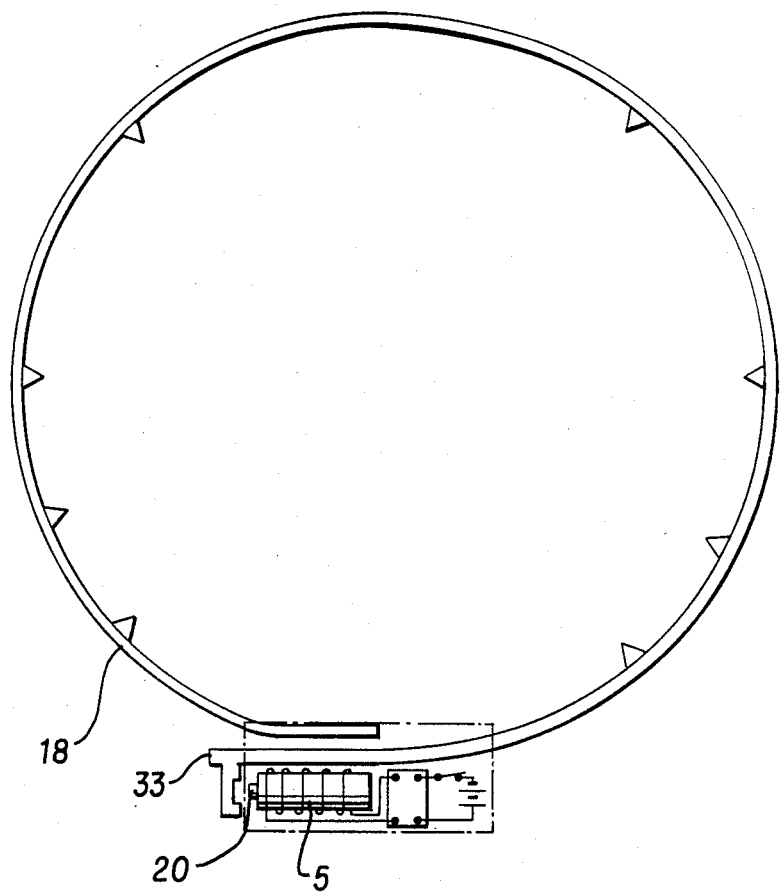
FIG. 9 shows the embodiment of FIG. 8 with the collar relaxed.

FIGS. 8 through 11 illustrate two alternative, simplified embodiments of the invention. In FIG. 8, the flexible collar 18 is attached at one end 33 to a stopper 34 and is free to otherwise move with respect to case 15. The other end of the collar 32 is fixed, however, to the case 15. Within the case 15 are assembled battery pack 3, radio receiver 4, on-off switch 2, solenoid 5. Activation and deactivation of the solenoid 5 is essentially as heretofore described and is controlled by signals received by the radio 4 from a remote location. When the solenoid 5 is activated, piston rod 20, which engages stopper 34, is ejected partially from the solenoid cavity thereby causing lateral displacement of the end 33 of the collar in the direction of the arrow. This lateral displacement of the end of the collar 33 past the other end of the collar 32 which is attached to case 15 causes tightening of the collar 18 around the animal's neck. Deactivation of the solenoid 5 occurs when electric power to it is terminated, either through receipt of an "off" signal or termination of the transmitted radio signal. When the solenoid is deactivated, piston rod 20 no longer is held in the displaced position relative to the solenoid but can return to its position within the solenoid cavity as shown in FIG. 9. This permits relaxation of the collar 18 around the animal's neck since the end of the collar 33 connected to stopper 34 is no longer required to be in the displaced position relative to fixed end 32.

Figure 10:
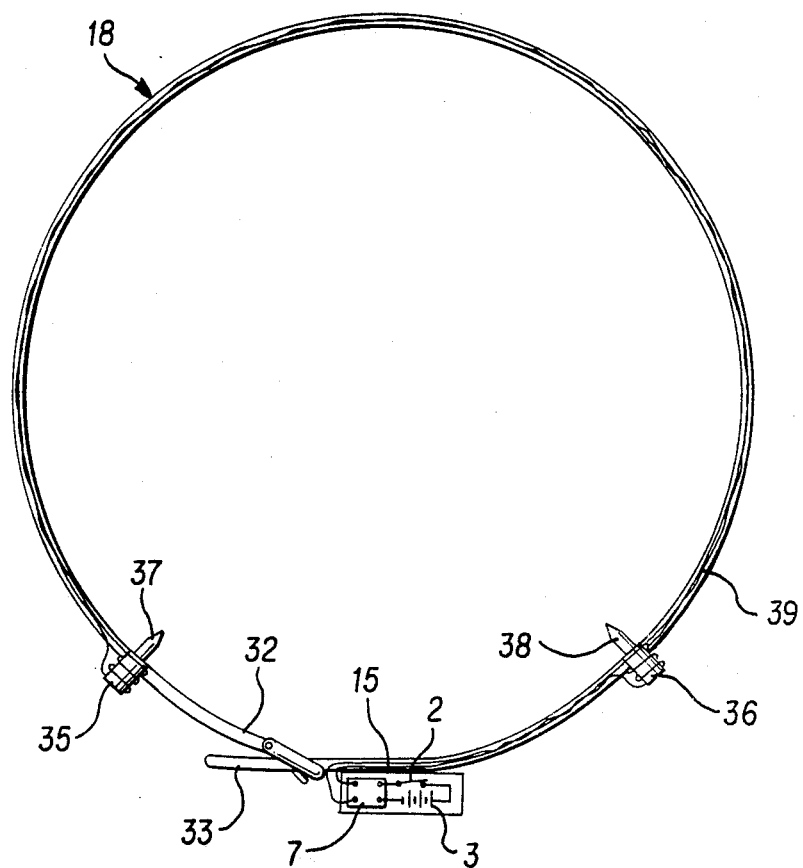
FIG. 10 is a cutaway side view illustrating yet another embodiment of the invention in position to apply pressure.
Figure 11:
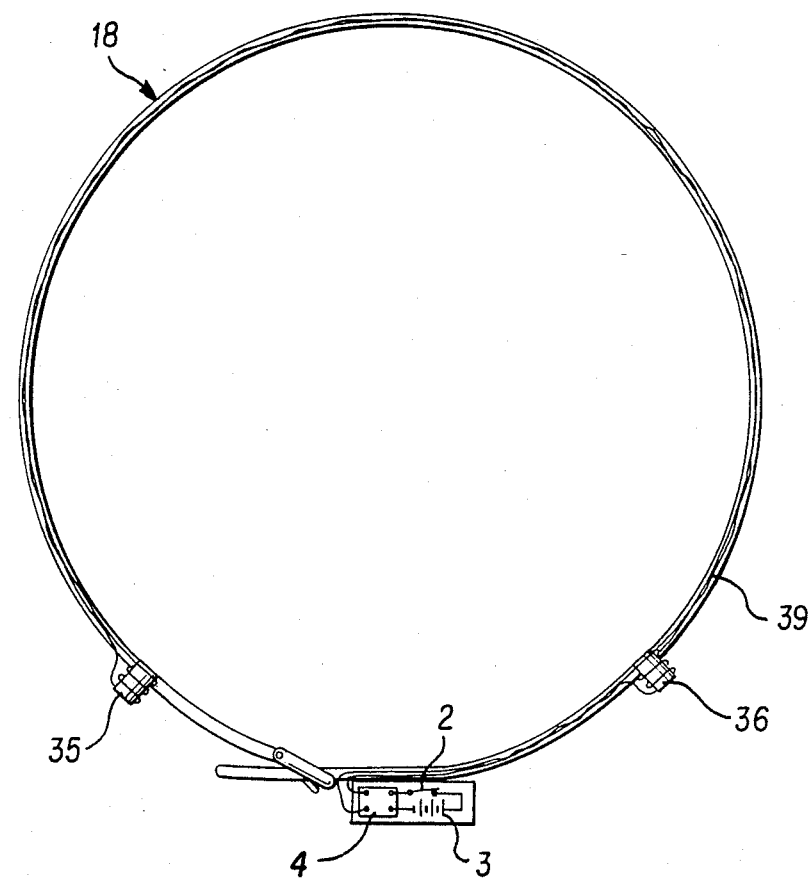
FIG. 11 shows the embodiment of FIG. 10 in relaxed position.

In FIGS. 10 and 11, an alternative embodiment is illustrated wherein the case 15 contains only radio receiver 4, battery pack 3 and on-off switch 2. The two ends of the collar 18, 32 and 33, are adjustably connected in conventional manner such as by a buckle to fit comfortably around the animal's neck. Conductive wires 39 are embedded in the collar and connected to battery pack 3 through radio receiver 4 such that, any receipt of the appropriate, remote transmitted radio signal, causes electric energy to be transmitted through the wires 39 to solenoids 35 and 36 placed in the collar 18. Each of the solenoids is provided with a piston rod, 37 and 38 respectively, which is displaced radially inward with respect to the collar towards the animal's neck when the solenoid is activated by electric energy. The tapered points of the rods 37 and 38 thus exert pressure on the animal's neck without having sufficient force or projection to cause injury. Termination of electric energy to the solenoids is caused by receipt or termination of the remote radio signal and allows the rods 37 and 38 to return to relaxed position within the solenoid cavities. It will, of course, be apparent that only one or more than two, opposed solenoids can be employed and their position around the collar can vary within the scope of the invention.

It will further be understood that the present invention can be modified by the inclusion or substitution of various devices and accessories known in the art as will be appreciated by those having ordinary skill in this technology. Such modifications and additions are considered to fall within the scope of the present invention as defined within the claims appended hereto.

I claim:

1. An animal training collar comprising in combination: a flexible strap at least a portion of which is adapted to encircle the neck of an animal said strap being provided with means for applying pressure to said animal's neck on receipt of a remotely broadcast radio signal, a radio receiver means for receiving said remotely broadcast radio signal and converting it to an on/off switching signal, an electric power source connected to said means for applying pressure by tightening said strap around the animal's neck; said pressure means being activated by switch means connected through said radio receiver to said power source to transmit power to said pressure means on receipt of said on signal and to terminate said power on receipt of said off signal.

2. The training collar of claim 1 wherein said means for applying pressure to said animal's neck consists of a solenoid having a piston rod disposed therein and engaging one end of said collar, which end is otherwise free to move relative to the other end of the collar; said piston rod being adapted to be displaced from said solenoid upon activation thereof to thereby tighten said collar around the animal's neck and exert pressure thereon.

3. The training collar of claim 2 wherein said displacement of said piston rod causes said one end of said collar to move away from said other end to thereby decrease the radius of the collar around the animal's neck and apply pressure thereto.

4. The training collar of claim 1 wherein said means for applying pressure to said animal's neck is one or more solenoids disposed at intervals within said collar, said solenoids each including a piston rod disposed therein and radially aligned with respect to the animal's neck; activation of said solenoids causing displacement of said piston rods out of the solenoids in said radial direction to apply pressure to the animal's neck.

5. The training collar of claim 4 wherein said solenoids are disposed in opposing pairs on said collar.

6. The training collar of claim 4 wherein said solenoids are connected with said switch means and power source by wires disposed in said collar.

7. An animal training collar comprising an elongated flexible strap adapted to encircle the neck of an animal and provided with means for applying pressure to the animal's neck on receipt of a remotely provided signal, said pressure means being one or more electrically activated solenoids disposed in said collar and provided with piston rods which are radially displaced toward the animal's neck on receipt of said signal.

* * * * *